United States Patent [19]

Biehl et al.

[11] 4,217,851
[45] Aug. 19, 1980

[54] TABLET COATING APPARATUS

[75] Inventors: Raymond J. Biehl, Monsey; William H. Marlow, Nanuet, both of N.Y.

[73] Assignee: American Cyanamid Company, Stamford, Conn.

[21] Appl. No.: 69,674

[22] Filed: Aug. 27, 1979

[51] Int. Cl.[2] ............................................. A23G 3/20
[52] U.S. Cl. ................................... 118/20; 427/213; 118/19; 118/24; 118/62; 118/303; 118/DIG. 5
[58] Field of Search .................... 118/303, 19, 24, 20, 118/62, DIG. 5; 427/213, 3

[56] References Cited

U.S. PATENT DOCUMENTS

| | | | |
|---|---|---|---|
| 3,241,520 | 3/1966 | Wurster | 118/303 |
| 3,386,182 | 6/1968 | Lippert | 118/303 |

*Primary Examiner*—Sam Silverberg
*Attorney, Agent, or Firm*—Robert P. Raymond

[57] ABSTRACT

Apparatus useful for spray coating discrete particles, such as pharmaceutical tablets, with liquid coating compositions which are essentially free of organic solvents, the apparatus having at least three spaced spray nozzles mounted on a spray manifold having a conical surface design which is located within a vertically disposed two-zone coating chamber, having a gas inlet at the chamber base adapted to project the particles to be coated through a coating zone for recirculation through a drying zone.

3 Claims, 12 Drawing Figures

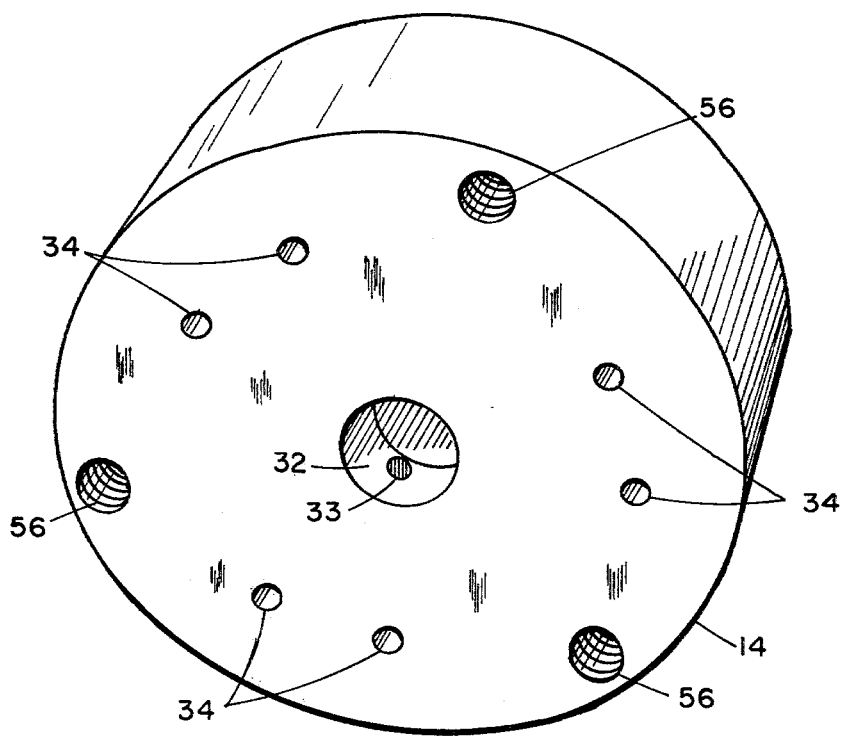
FIG. 7
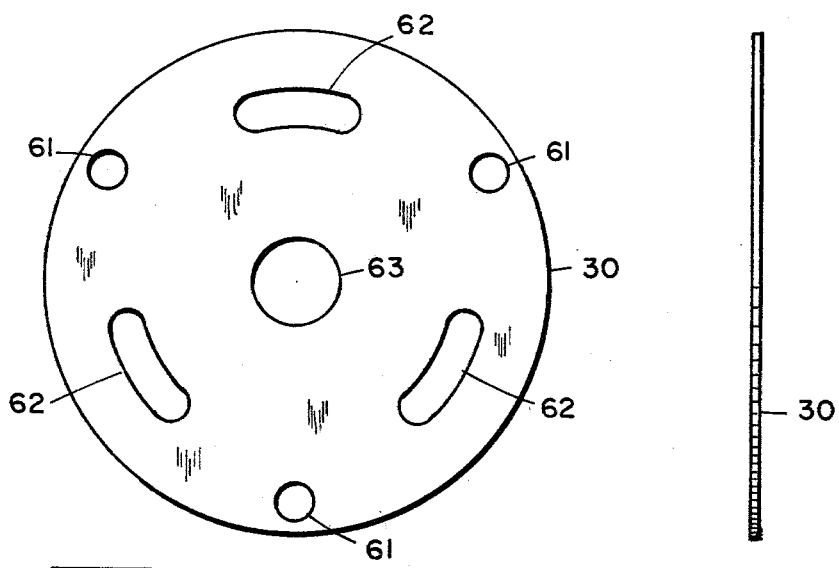
FIG. 8
FIG. 9

TABLET COATING APPARATUS

SUMMARY OF THE INVENTION

The present invention concerns an apparatus useful for spray coating discrete particles such as pharmaceutical tablets with liquid coating compositions. An object of the invention is to provide a coating system which is useful in the application of liquid coating compositions which are essentially free of organic solvents as well as non-aqueous coating compositions. Another object is to provide a convenient, inexpensive and easily operated tablet coating system which provides uniform coatings of tablets with aqueous finishing compositions.

The present invention comprises in combination at least three, spaced spray nozzles mounted on a spray manifold having a conical surface design. The manifold is located within a vertically disposed two-zone coating chamber having a gas inlet at the chamber base adapted to project the particles to be coated through a coating zone for recirculation through a drying zone.

BACKGROUND OF THE INVENTION

The coating of pharmaceutical tablets, granules, pellets and other discrete particles is commonly conducted in an air suspension film coating apparatus which has been referred to as a Wurster coater and to which U.S. Pat. No. 2,648,609 relates.

In principle the Wurster coater operates by repeatedly cycling the particles through a coating zone into a drying zone using gas streams to direct the particle flow and dry the coated particles.

A variety of modifications of the Wurster apparatus have been proposed in the following subsequent issued U.S. Pat. Nos.: 2,799,241; 3,089,824; 3,117,027; 3,207,824; 3,253,944; 3,241,520; 3,253,944; and 4,117,801.

A typical air suspension film coating apparatus is depicted in FIG. 7 of U.S. Pat. No. 3,241,520.

In operation the uncoated tablets are suspended in a vertical air stream using an air suspension apparatus and a horizontal perforated disc. The tablets are placed on the disc and an air source forces heated air through the perforations causing the tablets to rise in a cylinder that is contained within a large outer cylinder. An atomizing spray nozzle is located within the inner cylinder and provides a constant spray. The tablets rise in the air stream, receive a spray coating then fall gently through the outer cylinder back to the plate where the cycle is repeated until a satisfactory film coat is obtained.

Organic solvents have conventionally been used in this process as a means of solubilizing the film-former, surfactant, plasticizer and other coating ingredients. Lower alkanols (e.g. methanol), methylene chloride, specially denatured alcohols, and chloroform have been generally used for this purpose.

During the course of applying the film coating to the tablets, these organic solvents are evaporated by the heat and forced air so that they do not appear in the final product. This removal of the organic solvents presents certain fundamental problems to the pharmaceutical industry in that (1) the highly volatile organic solvents must be shielded from ignition sources to prevent explosion, (2) the solvent vapors are a threat to the environment as well as to the operators of the equipment, (3) the organic solvents are expensive and, since many are petroleum based products, are becoming scarce and (4) the procedures and equipment required to successfully remove the vapors from the environment are expensive.

To obviate the expense and inconvenience of traditional tablet coatings employing organic solvents, aqueous film coating systems have been resorted to. Use of such aqueous compositions has led to problems in achieving uniform, smooth finishes. It is an object of the present invention to provide an apparatus designed to overcome or minimize such problems. While the principal advantage of the present invention relates to the use of aqueous finishing compositions, the present invention is directed to the apparatus not the finishes and the apparatus can be employed with conventional, organic solvent based finishes as well.

BRIEF DESCRIPTION OF DRAWINGS

FIG. 7 is a perspective view from the bottom of the conical spray manifold which receives the manifold base of FIG. 10.

FIG. 8 is a view from above of an annular gasket for sealing the manifold of FIG. 7 to the manifold base of FIG. 10.

FIG. 9 is a profile view of the gasket of FIG. 8.

DETAILED DESCRIPTION OF A PREFERRED EMBODIMENT

Figure 1:
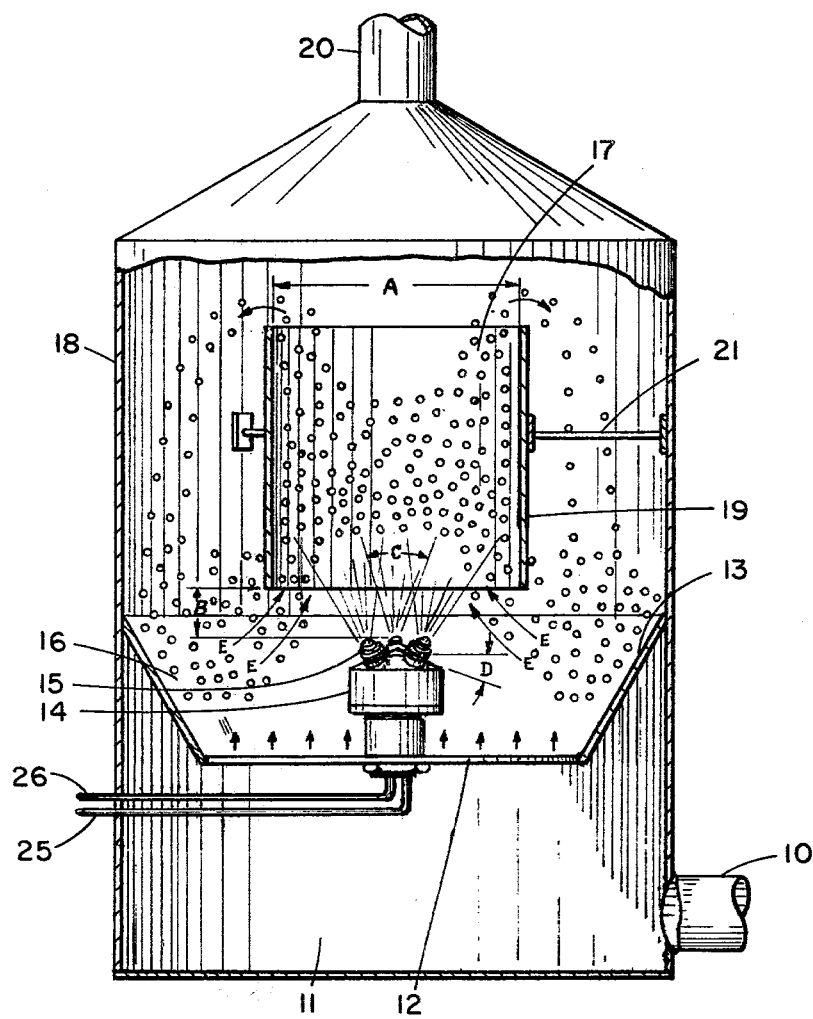
FIG. 1 is a longitudinal, sectional view of the vertically disposed coating chamber.

Referring more particularly to FIG. 1, an apparatus preferred for use in the practice of the present invention is graphically depicted therein. It is basically disposed within a cylindrical coating tower 18 constructed of a rigid material such as steel or aluminum or preferably of a clear plastic material which permits easy viewing of the coating procedure and is adapted with a gas inlet 10; gas exhaust 20; and a pair of air and liquid feed lines 25 and 26, respectively.

The gas inlet 10 feeds a gas chamber 11 in which the suspending gas is distributed and directed in an upward current through the gas distribution plate 12. Chamber 11 can optionally be equipped with a gas heating means or means for directing or channeling the gas flow. Feed lines 25 and 26 can be brought downward through the chamber base if desired.

The spray manifold 14 with an associated atomizing spray nozzle 15 is conveniently mounted on the gas distribution plate 12, positioned in coaxial relationship to the coating tower 18 and interior tube 19. The interior tube may be mounted within the coating tower by one or more support brackets 21.

Figure 2:
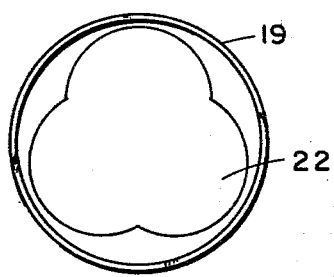
FIG. 2 is a top view of the coating zone along line A of FIG. 1.

A trilobal spray distribution pattern 22 within interior tube 19 is depicted from above in FIG. 2.

Figure 3:
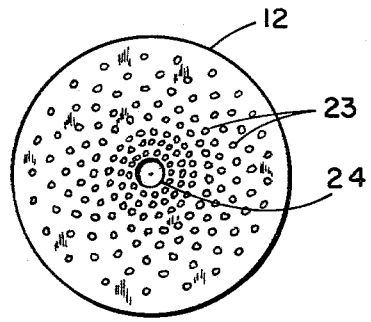
FIG. 3 is a top view of the supporting grid.
Figure 4:
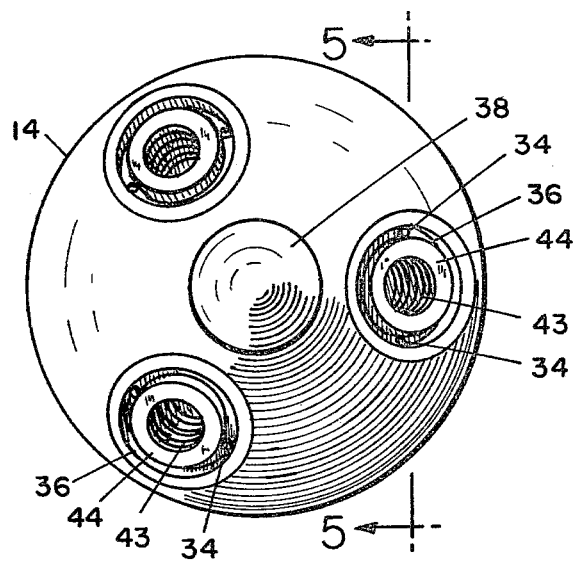
FIG. 4 is a perspective view from above of a manifold for use in the practice of the present invention showing the ports for mounting three spray nozzles.
Figure 5:
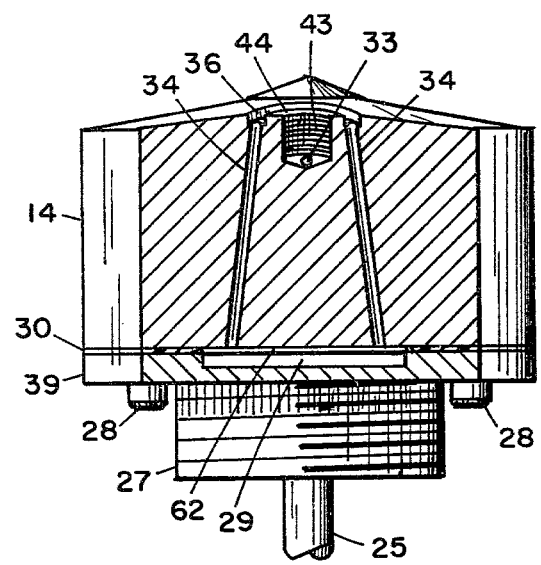
FIG. 5 is a longitudinal, sectional view of the conical spray manifold along line 5—5 of FIG. 4.
Figure 6:
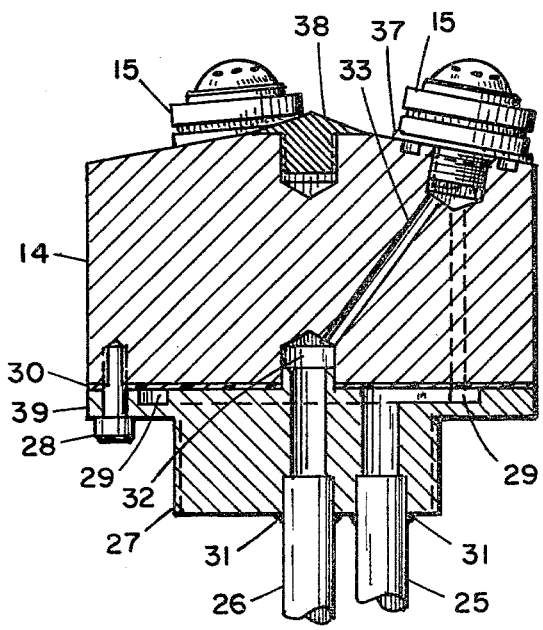
FIG. 6 is a longitudinal, sectional view of the vertically disposed spray manifold useful in the practice of the present invention.
Figure 10:
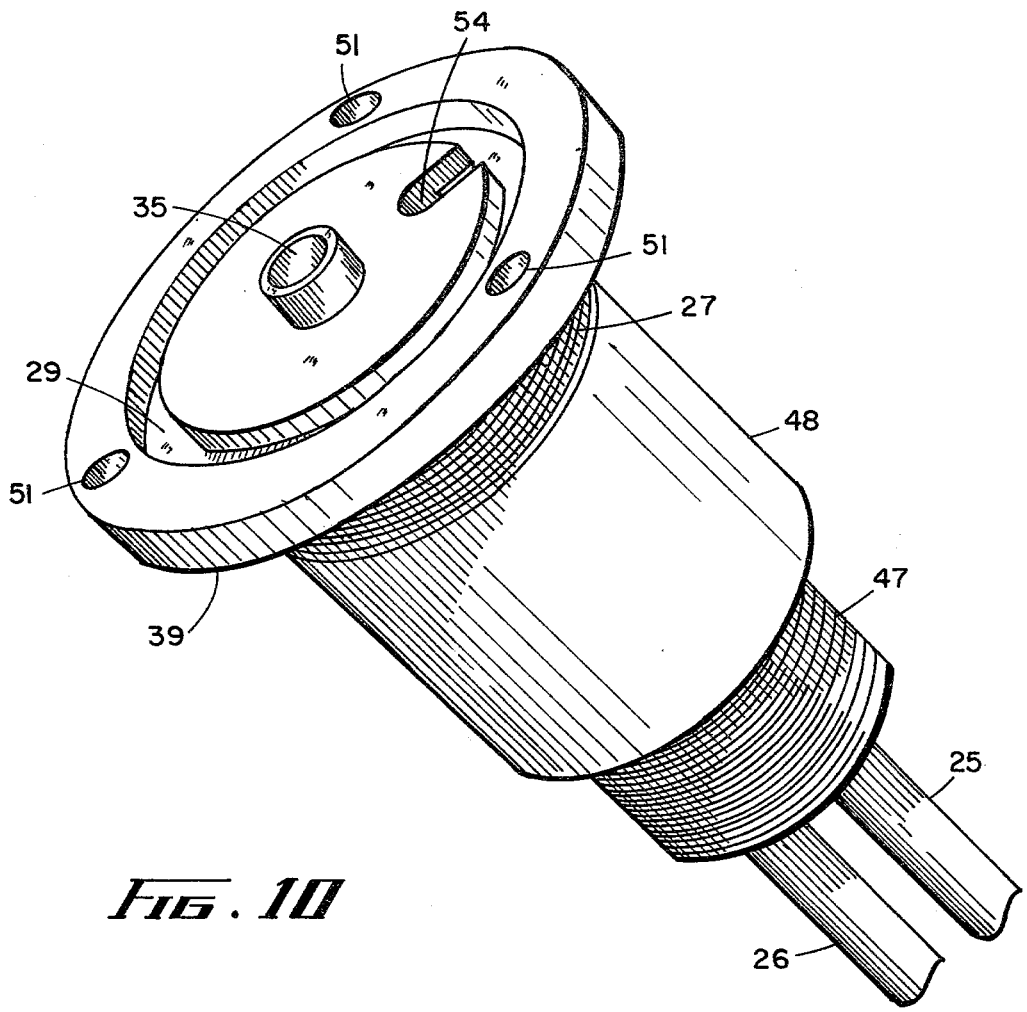
FIG. 10 is a perspective view from above of a manifold base.
Figures 11, 12:
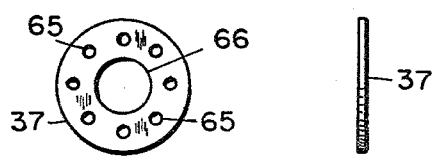
FIG. 11 is a view from above of an annular gasket for sealing one of the atomizing spray nozzles to the manifold of FIG. 4.
FIG. 12 is a profile view of the gasket of FIG. 11.

FIG. 3 depicts a gas distribution plate 12 from above showing a spray manifold mounting orifice 24 and concentric perforations 23 having a greater concentration toward the center of the gas distribution plate. This results in a gas stream gradient of higher velocity toward the center of the coating tower and lower velocity toward the walls of the tower. The gas flow gradient produces a propulsion of the particles to be coated upwardly into the coating area 17 inside tube 19 followed by a recycling of the coated particles downward through the lower velocity gas in the drying zone exterior to tube 19, whereafter the particles are guided back into the particle accumulation area 16 toward the center of the tower via a truncated, cone-shaped fall-in shute 13 rising upward again as depicted by the directional arrows marked E in FIG. 1.

The angle of slope (D) for the placement of the multiple spray nozzle assemblies in the manifold is dependent on the variables (A) and (B) illustrated in FIG. 1. The spray pattern angle (C) in FIG. 1 is mainly a function of the spray nozzle assembly utilized and the spray rate employed.

FIG. 4 illustrates a preferred spray nozzle from above equipped with three equidistantly spaced threaded spray nozzle mounting ports 43 located upon the upper conical surface of spray manifold 14. Each port is adapted with a spray nozzle air annulus 36 fed by two air orifices 34 contained in the body of the manifold. The liquid fed to the atomizing spray nozzles is through the threaded spray nozzle mounting ports 43. A particle deflection cone 38 is mounted in the center of the spray manifold. During the machining of the manifold, it is convenient to drill a hole in the center of the upper surface of the manifold in which to hold the manifold in the lathe. The deflection cone serves to plug the hole in a manner which prevents accumulation of the coated particles on the spray manifold. The spray nozzle sealing surface 44 serves to separate the liquid and air feeds to the atomizing spray nozzle.

FIG. 5 is a view of the spray manifold and manifold base plate 39 taken along line 5—5 of FIG. 4. As shown, the pair of air orifices 34 which feed the spray nozzle air annulus are drilled off center down to the base plate air annulus 29. No advantage is secured thereby. The pair of orifices can be drilled straight down through the manifold so long as they properly align with the base plate air annulus.

FIG. 6 is a further view of the spray manifold. However, it is through the center of the manifold. In this view air feed line 25 can be seen to enter the bottom of the manifold base plate 39 to the right of the liquid feed line 26. Each is fixed in place and sealed via a weld 31.

The air feed line communicates with the base plate air annulus 29 which in turn communicates with the air orifices which feed the atomizing spray nozzles 15.

The liquid feed line 26 communicates with a liquid feed chamber 32 within the base of the spray manifold. The liquid feed chamber communicates with each atomizing spray nozzle via a liquid orifice 33 drilled in the spray manifold. The base plate 39 is aligned with and attached to the spray manifold by means of mounting bolts 28 which pass up through a base plate sealing gasket 30. The atomizing spray nozzle is sealed to the manifold by means of spray nozzle gasket 37. The lower portion of the base plate is adapted with a threaded mounting collar which enables the manifold to be affixed to the gas distribution plate 12 via a nut as depicted in FIG. 1.

FIG. 7 is a view of the bottom of the spray manifold showing the three pairs of air orifices 34; three threaded manifold mounting holes 56 adapted to receive mounting bolts 28; the liquid feed chamber 32; and liquid feed orifice 33.

FIG. 8 is a view of the sealing gasket adapted to seal the base plate of FIG. 10 to the bottom of the spray manifold of FIG. 7. The gasket is provided with three mounting holes 61 through which the mounting bolts 28 pass. It is also provided with three air feed slots 62 each of which seals one pair of air feed orifices 34 in the bottom of the spray manifold shown in FIG. 7. When the base plate sealing gasket is in place, the air feed orifices are positioned above the base plate air annulus 29 shown in FIG. 10. The liquid feed slot 63 is positioned over base plate flange 35 which is adapted to be inserted into the liquid feed chamber in FIG. 7 and conduct the flow of coating liquid into the liquid feed chamber 32.

FIG. 9 is a profile view of the sealing gasket of FIG. 8.

FIG. 10 is a perspective view from above of a manifold base plate equipped with an extension mounting collar 48 which is threaded 47 for mounting on to the gas distribution plate 12 of FIGS. 1 and 3. Use of an extension collar is a convenient means of adjusting the height of the spray nozzle in relationship to the interior tube 19 in which the coating takes place (distance B in FIG. 1). Where it is desired to mount the spray manifold in a lower position, the threaded mounting collar 27 can be bolted directly to the gas distribution plate. The upper surface of the manifold base plate 39 is adapted with a flange 35 which conducts the pressurized coating liquid to the spray manifold and an air annulus 29 which conducts the pressurized gas to the spray manifold. The air annulus is fed by the base plate air feed chamber 54 which in turn is fed by air feed line 25. The base plate is provided with mounting holes 51 adapted to permit it to be bolted to the bottom of the spray manifold.

FIG. 11 depicts a spray nozzle gasket 37 suitable for sealing the atomizing spray nozzle to the surface of the spray manifold. The gasket is provided with a pressurized liquid slot 66 at its interior and several pressurized air slots 65 adapted to permit passage of the coating liquid and pressurized air from port 43 and air annulus 36 of the spray manifold (see FIG. 4) to the atomizing spray nozzles.

In operation the apparatus of the present invention provides a means for directing an aqueous coating material in finely divided form into a coating zone so that the coating material comes in contact with and adheres to the surface of the individual particles or tablets to be coated while they are being transported upwardly in the coating zone, substantially out of contact with each other, to the top of the coating zone by which time the adhering coating material is already partially dry.

The spray manifold may be constructed of a variety of materials. One may use metals such as brass, aluminum, stainless steel and the like or a hard plastic material such as Lucite®. As described above, the manifold unit is conveniently equipped with a removable base plate. The upper portion of the plate preferably is a circular disc 3 inches in diameter and ¼ inch thick. The plate can be provided with an annular channel machined into the top surface beginning 5/16 inches in from the outer edge, which is ¼ inch wide and 1/16 inch deep. This annulus is fed by another channel of the same dimensions which originates from within a ⅜ inch diameter reamed hole which is centered 9/16 inches from the center of the plate. A desired length of ⅜ inch diameter stainless steel tubing (air line) is fitted into this opening by conventional means in a manner such that the upper end of the tubing is flush with the top of the plate and the remaining length extends through the plate bottom. The area of tubing abutting the channel is then grooved to allow a clear passage into the channel. The bottom cap plate can also be provided with ½ inch diameter hole exactly on center into which is fitted by conventional means a desired length of ½ inch diameter stainless steel tubing (liquid film coating line), flush with the top of the plate, and extending through the bottom of the plate. A threaded collar 1½ inches in diameter and ¾ inch in length can be centered on the bottom of the plate and affixed to the plate by conventional means. This collar provides a means for attaching the assembled spray manifold within the coating apparatus. The lengths of ⅜ inch and ½ inch stainless steel tubing which extend from the bottom of the base plate are fitted with the desired quick-disconnect fittings for attachment to the main supply lines for both air and the liquid film coating formulation.

The main body of the spray manifold preferably is cylindrical in shape with a diameter of 3 inches and a height of 1⅜ inches at the apex.

The top of the manifold can be machined to provide a predetermined conical slope starting at a point ⅛ inch from the exact center of the cylinder and extending to the outer edge. Then three equidistant air annulus holes, each centered 1 1/16 inches from the exact top center of the manifold and each 11/16 inch in diameter and 3/32 inch deep can be reamed through the manifold body perpendicular to the slope. Within the exact center and from the top of each of the 3 air annulus openings described above can be drilled and threaded a ⅜ inch diameter and ½ inch deep hole which is provided to accommodate a complete spray nozzle assembly consisting of a suitable fluid and air cap, both commercially available from the Water Cooling Corporation.

The bottom of the manifold can be provided with a hole ½ inch in diameter and 9/16 inch deep drilled at the exact center. This hole can be reamed further at a diameter of 7/16 inch to a total chamber depth of 1 7/16 inches. Then a 5/32 inch liquid orifice connecting passage can be reamed in the base of each of the threaded nozzle accommodating holes described above downward, and toward the center, at a predetermined angle (which is measured from the exact center of the manifold top to the exact center of the proposed 5/32 inch orifice) and opening into the lower chamber at the base.

The three air annulus rims in the top of the manifold can each be provided with an air supply orifice which is 3/32 inch in diameter and is located toward the outer edge of the manifold circumference. The holes can be reamed downward through the manifold at a predetermined angle designed to provide direct access to the bottom cap plate air annulus channel and with an equidistant spacing among the orifices.

The main body of the spray manifold and the bottom of the base plate can be aligned and fitted together with a teflon gasket between them with cutouts provided for the central film coat liquid supply line and the air orifices. Then they can be fastened together with three ¼ inch machine bolts of suitable length, spaced equidistant from each other and located in the circumference outside of the air annulus. The bolts will then pass through the base plate and be threaded into the manifold body. Then, three commercially available spray nozzle assemblies, previously described, can be threaded and tightened into the holes provided in the top of the manifold with a perforated teflon gasket being used as a seat between the nozzles and the manifold.

While this invention has been described in detail with particular reference to preferred embodiments thereof, it should be understood that variation and modifications can be effected within the spirit and scope of the present invention.

As shown above, a regular (symmetrical) trilobal atomized spray manifold has been described and is preferred but a regular polylobal spray head of more than three spray nozzles can likewise be employed if desired. A wide variety of atomizing spray nozzles of both the compressed air variety and airless sprayers are known and can be used to advantage in the practice of the present invention. Spray nozzles equipped with heating means are known. Such nozzles or alternative heating means can be employed where it is desired to reduce the viscosity of the coating liquid or accelerate drying. The drying time can also be accelerated by heating the suspension gas.

As mentioned above and disclosed in the above references, support screens and gas channeling means can be used in addition to or in lieu of the gas distribution plate.

By providing a conventional Wurster tablet coating apparatus with a spray manifold having three equispaced atomizing spray nozzles as described above, a charge of 127,400 capsule shaped tablets can be provided with a uniform finish of acceptable appearance and quality using an aqueous finish prepared in accordance with the following. A charge of 229 g. of sodium lauryl sulfate is added to 17,836 ml. of water with agitation. Thereafter, 1147 g. of hydroxypropyl methylcellulose 6 cps. is added and agitated until in solution. Next 764 g. of Opaspray K-1-1569 is added followed by 408 g. of light mineral oil, which is added slowly with rapid agitation. Thereafter, 0.510 g. of medical antifoam C emulsion (commercially available from Dow Corning Corp.; composed of 30% simethicone, dimethylpolysiloxane and silica aerogel; 1.6% methyl cellulose U.S.P. grade; 0.075% sorbic acid; and water) is added and the agitation is regulated to prevent the formation of foam. The resulting composition is employed as the coating liquid. The temperature in the coater is regulated to between 100°–140° F. by heating and particle suspension gas. Opaspray is a product of Colorcon, West Point, Pennsylvania. The K-1-1569 coloring ingredient is a mixture of D & C Red #30 lake, Blue #2 lake, $TiO_2$ and hydroxypropyl cellulose.

The optimum equipment design and operating conditions will naturally depend upon the nature and volume of manufacture, type of particles and coating desired and the like. In the case of pharmaceutical tablets, the coating operation will likewise obviously have to be tailored to the finished tablet desired.

Having thus described the invention, what is claimed is:

1. An apparatus useful in the application of liquid coating compositions which are essentially free of organic solvents to discrete particles such as pharmaceutical tablets, said apparatus comprising, in combination: a vertically disposed coating chamber containing coating and drying zones; a gas inlet means at the bottom of the chamber adapted to assist drying of the coated particles in the drying zone by providing an upward current of gas through which the particles drop and are adapted to project the particles to be coated upwardly through the coating zone; a spray assembly disposed within said coating chamber below said coating zone, said spray assembly comprising a manifold having a conical upper surface axially disposed within said coating chamber and adapted with three or more atomizing spray nozzles equidistantly disposed on the conical upper surface of said manifold and means for introducing the coating liquid to said atomizing nozzles for projection of a regular polylobal atomized spray of the coating liquid in the coating zone.

2. An apparatus according to claim 1 wherein the manifold is further characterized as having three atomizing spray nozzles equidistantly spaced on the upper conical surface of the manifold and in that the atomizing spray nozzles are each mounted over pressurized gas and liquid flow passages located within the body of the manifold.

3. An apparatus according to claim 1 wherein the gas inlet means is a gas plenum located at and forming the base of the coating chamber, the discharge port of said plenum being provided with a supporting grid having openings of diminished size toward the circumference of the screen thereby being adapted to provide a boundary layer of drying gas of diminished velocity to the central core of air effecting the projection of the particles through the coating zone for recirculation downward through the drying zone.

* * * * *